No. 680,025. Patented Aug. 6, 1901.
R. DECROLY.
BEEHIVE.
(Application filed Feb. 7, 1901.)
(No Model.) 7 Sheets—Sheet 1.

Witnesses:
T. D. McMahon.
G. S. Noble

Inventor,
Raphael Decroly
by B. Singer, Att'y.

No. 680,025. Patented Aug. 6, 1901.
R. DECROLY.
BEEHIVE.
(Application filed Feb. 7, 1901.)

(No Model.) 7 Sheets—Sheet 3.

Fig. 3.

Fig. 5.

Witnesses:
J. D. McMahon.
G. S. Noble

Inventor,
Raphael Decroly
by B. Singer
Att'y.

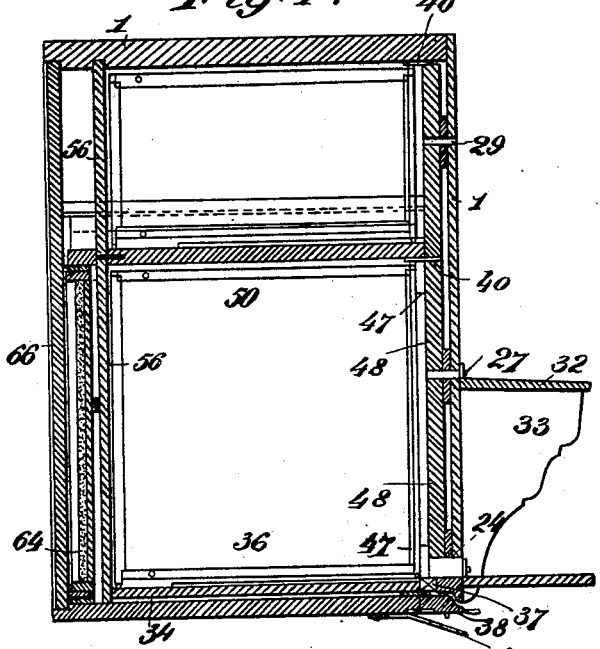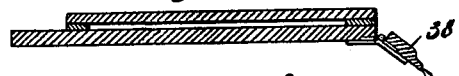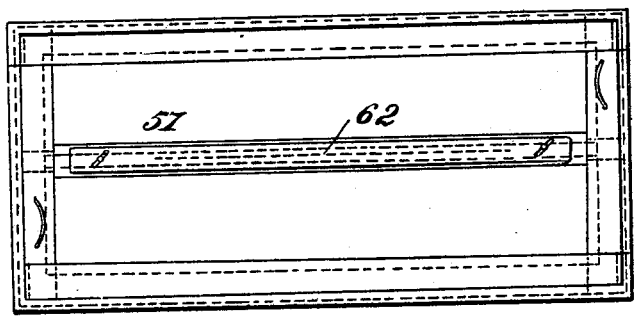

No. 680,025. Patented Aug. 6, 1901.
R. DECROLY.
BEEHIVE.
(Application filed Feb. 7, 1901.)
(No Model.) 7 Sheets—Sheet 5.
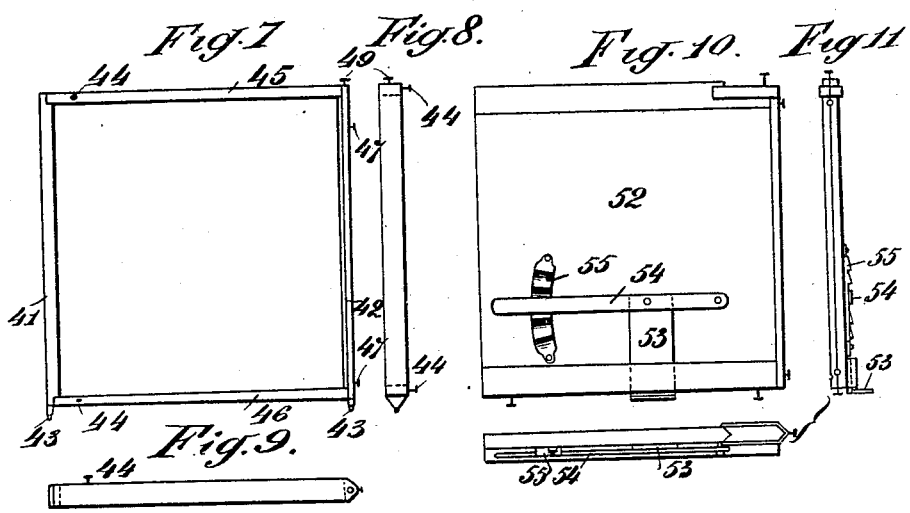
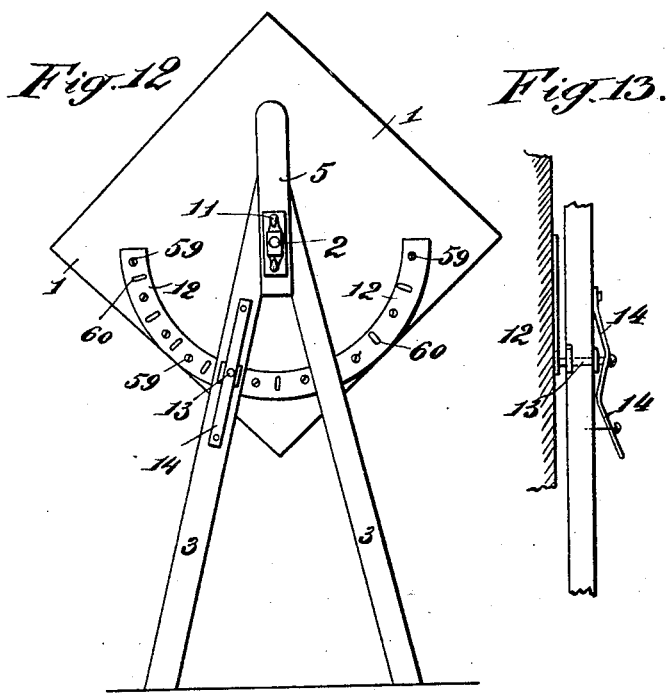

No. 680,025. Patented Aug. 6, 1901.
R. DECROLY.
BEEHIVE.
(Application filed Feb. 7, 1901.)
(No Model.) 7 Sheets—Sheet 6.
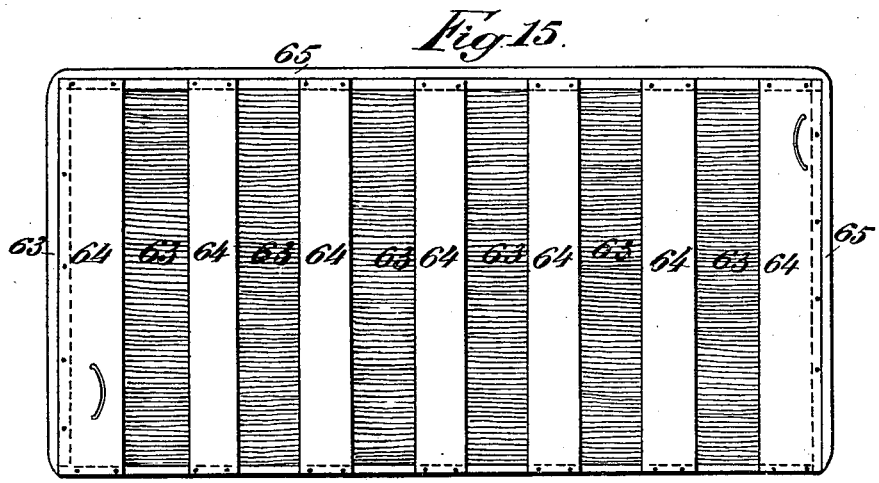
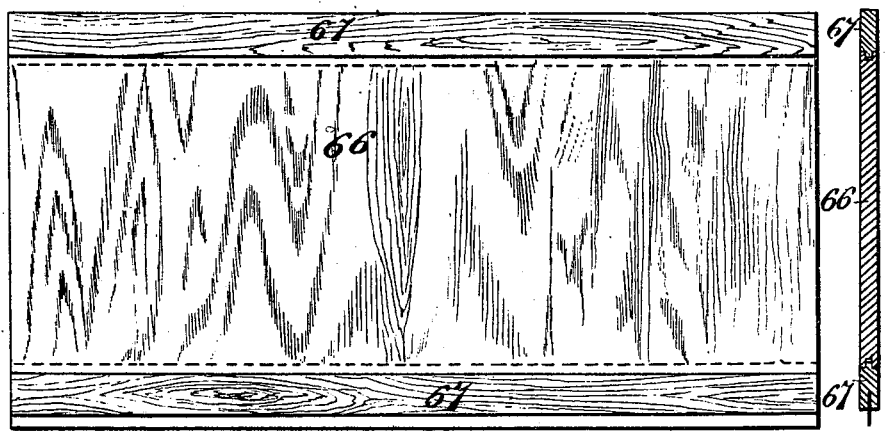
Witnesses: Inventor,
J. D. McMahon. Raphael Decroly
G. S. Noble by B. Singer. Att'y.

No. 680,025. Patented Aug. 6, 1901.
R. DECROLY.
BEEHIVE.
(Application filed Feb. 7, 1901.)
(No Model.) 7 Sheets—Sheet 7.
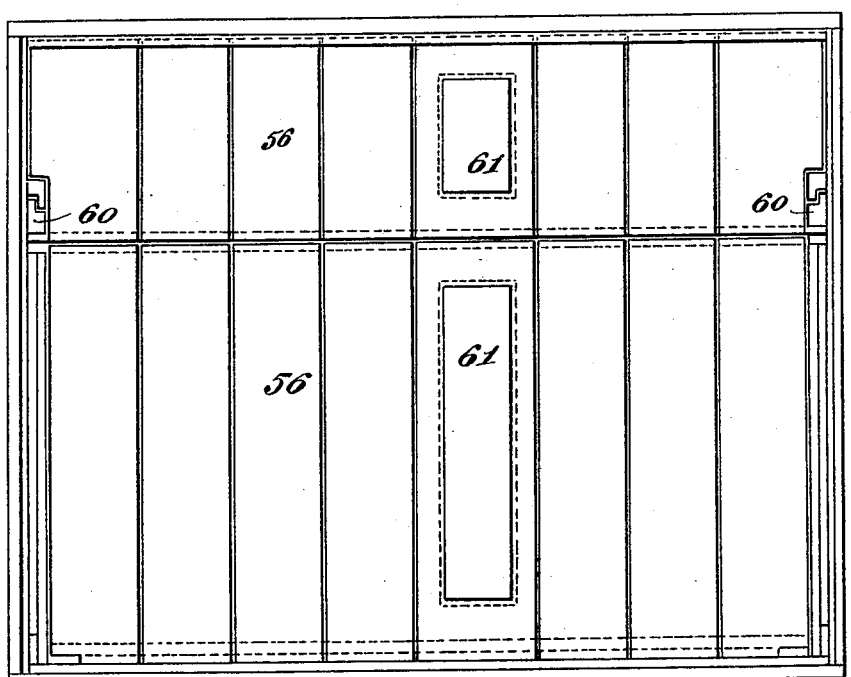
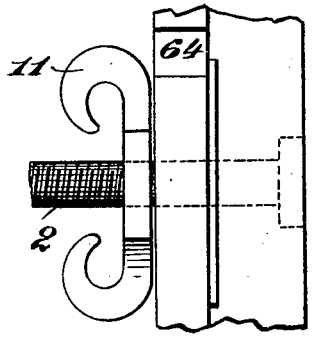
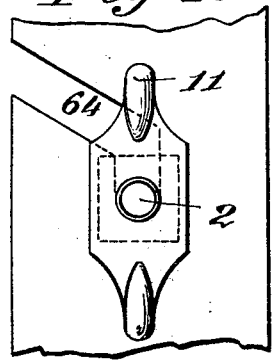
Witnesses:
T. D. McMahon.
G. S. Noble
Inventor,
Raphael Decroly
by B. Singer. Att'y.

UNITED STATES PATENT OFFICE.

RAPHAËL DECROLY, OF RENAIX, BELGIUM.

BEEHIVE.

SPECIFICATION forming part of Letters Patent No. 680,025, dated August 6, 1901.

Application filed February 7, 1901. Serial No. 46,395. (No model.)

*To all whom it may concern:*

Be it known that I, RAPHAËL DECROLY, a subject of the King of Belgium, and a resident of Renaix, Belgium, have invented certain new and useful Improvements in Beehives, of which the following is a specification.

My present invention relates to improvements in beehives, the object being to provide a beehive composed of frames adapted to be arranged at the desired distances apart, the hive being so mounted as to be adjusted to proper positions in summer and winter.

A further object is to provide an improved construction enabling the moisture to be easily removed from the hive without admitting an injurious current of air.

A still further object is to provide means whereby the series of frames may be increased or decreased, as desired, and to enable the beekeeper to readily ascertain the state of his hives.

Figure 1:
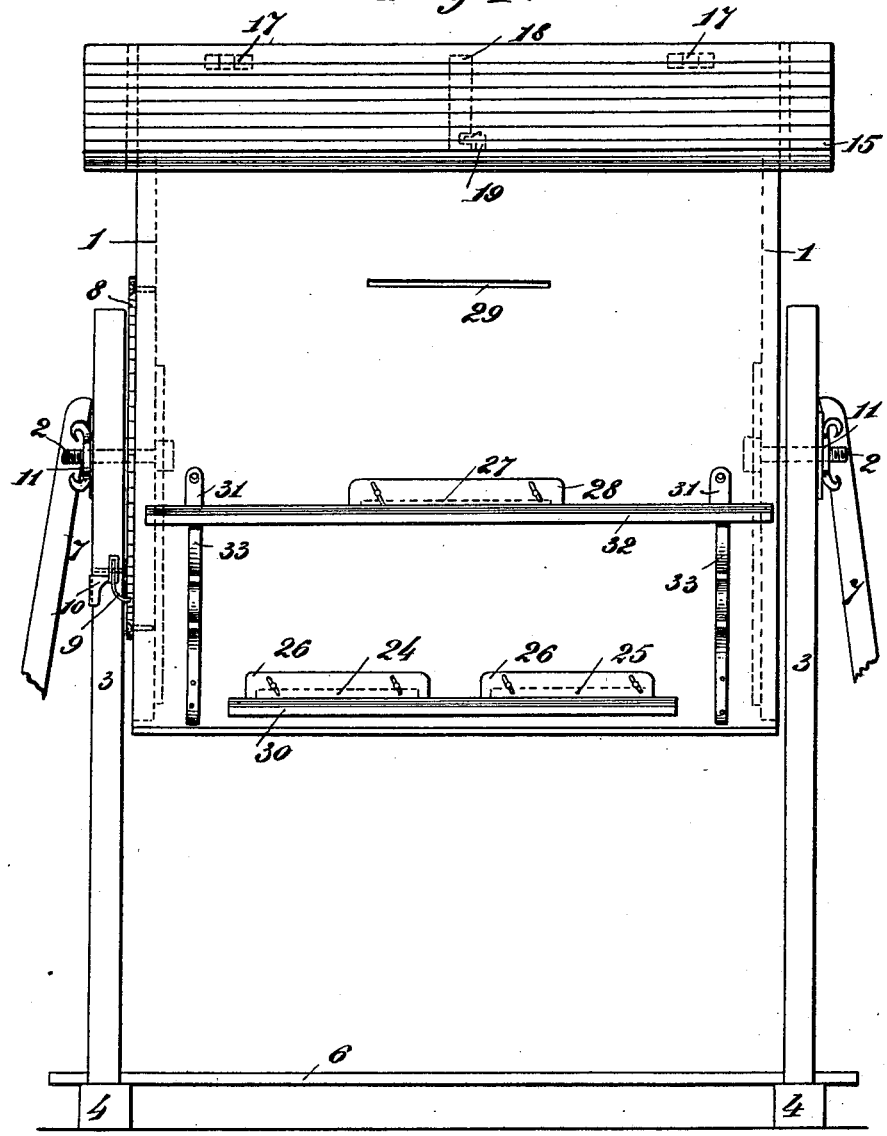
Figure 2:
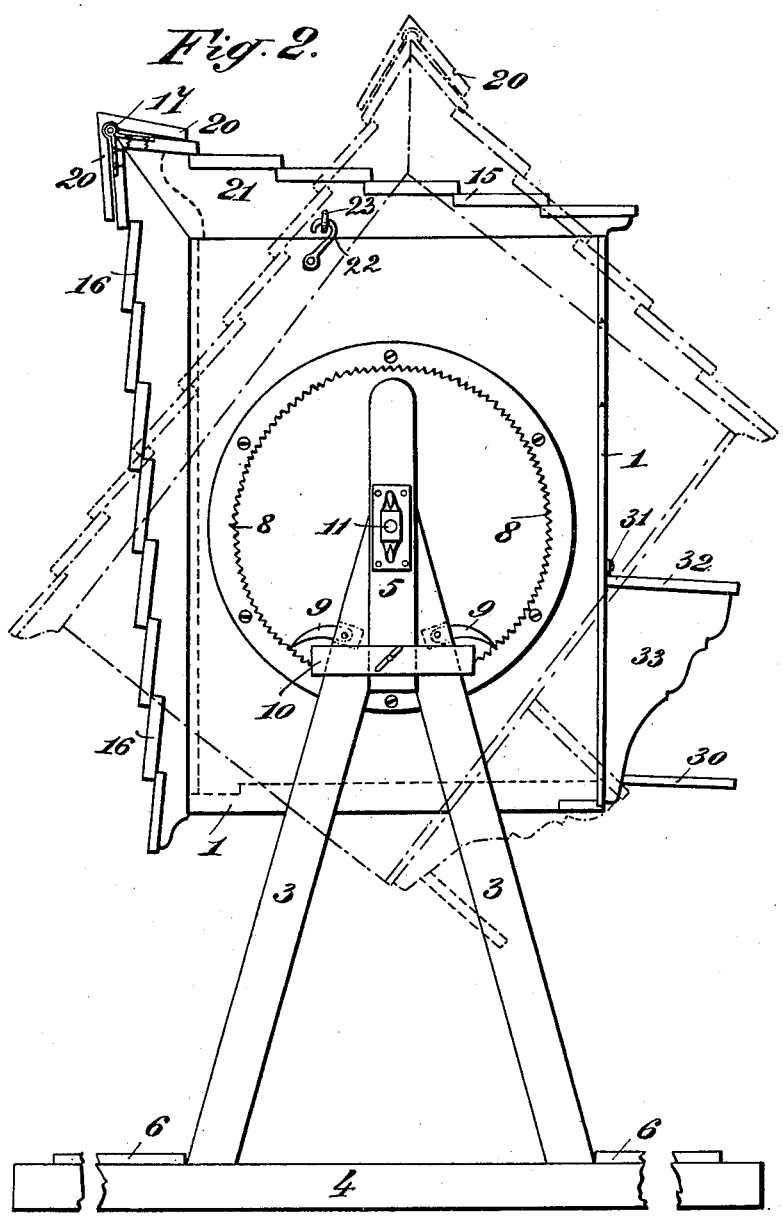

In the accompanying drawings, Figure 1 is a front elevation of a beehive constructed in accordance with my invention. Fig. 2 is a side elevation of the beehive in operative position, the dotted lines showing the hibernal position of the hive or as it is when undergoing any manipulation. Fig. 3 is a rear elevation of the hive proper with the door removed. Fig. 4 is a sectional view of the hive, the section being on line A B, Fig. 3. Fig. 5 is a section on line C D, Fig. 3, with the frames removed. Fig. 6 is a sectional view showing the lower wall of the hive. Figs. 7, 8, and 9 show a frame of the beehive and the guiding devices of said frame. Figs. 10 and 11 show a partition-wall provided with a rack-bar. Figs. 12 and 13 represent an oscillating beehive. Fig. 14 shows a glass-plated partition for use in summer. Fig. 15 shows a partition for use in winter. Figs. 16 and 17 represent a cover-plate for the brood and honey chambers. Fig. 18 is a rear elevation of the beehive with the door and winter partition removed to show the inner closing-plate. Figs. 19 and 20 are detail views showing the suspension device for the oscillating hive shown in Fig. 12.

Like numerals refer to like parts throughout all the views.

The improved beehive is composed of a rectangular casing 1, made of wood and having double walls separated by means of air-spaces, serving to protect the bees from the inclemency of the seasons. The side walls of the casing are provided with bolts 2 2, each of which is supported on inclined standards 3, connected at their base by means of a bar 4 and at their top by means of a vertical bar 5. The bars 4 are braced by means of planks 6 and also by means of brace-bars 7 7.

One of the characteristic features of my invention is the provision of an oscillating or rocking beehive adapted to be brought to the necessary inclined position in winter. In order to hibernate, the bees group in clusters and lose in the remote corners the necessary heat when the rectangular beehive remains in its horizontal position. When the beehive is inclined to an angle of forty-five degrees, the heat will be maintained all around the group of bees during the hibernating period—that is, when the hive is arranged in the horizontal position (indicated in full lines in Fig. 2) practically only the upper portion of the chamber is exposed to the direct rays of the sun, and the angle at which such rays strike the walls of the lower corners opposite the door or entrance is such that said corners are not heated as thoroughly as desirable if the hive is maintained in such horizontal position during the winter season. By adjusting the hive into the position indicated by dotted lines in said figure, however, it will be seen that the sun's rays will strike the walls at such an angle that all of the corners in which the bees will group themselves (being all of the corners excepting those adjacent the door or entrance) will be sufficiently heated.

The devices employed for oscillating or rocking the beehive will be varied according as they are applied to a beehive set up in the outer air or to a beehive set up in a closed apiary. In the first instance said device embodies a toothed ring 8, Figs. 1 and 2, suitably secured to one of the side walls of the beehive, with its center on the axis of the corresponding trunnion-bolt 2. Said ring is provided on its inner periphery with teeth adapted to be engaged by two pawls 9 9, pivotally connected in notches provided in the supporting-standards 3. Said pawls are adapted to be raised by means of a sleeve 10 in order to enable the beehive to be adjusted, said lever being pivotally mounted on the aforesaid bar 5 of the support or frame. Thumb-nuts screwed to the screw-threaded ends of the bolts 2 hold the latter in their bearings.

The operating device for the beehive set up in a closed apiary comprises a semicircular sheet-iron plate or segment 12, Fig. 12, secured by means of screws 59 to the side walls of the beehive, with its center on the axis of the trunnion-bolts 2. Said segment is provided with a plurality of oblong holes 60, one of which is located so that when the beehive is oscillated to an inclination of forty-five degrees a pin 13, secured to a flat spring 14, arranged on the standard 3, engages said hole by the action of said spring. When the beehive is brought to its horizontal position, said pin will engage another hole 60.

The beehive to be set up in the outer air is provided with a roof made of two parts, one, 15, of which is fixed on the top of the beehive, while the part 16 is movable and hinged at 17 to the part 15. Between said roof and the outer walls of the beehive is provided a large space constituting a cool chamber in summer and adapted to be filled with straw or like materials to provide a warm chamber in winter. The movable part of the roof is arranged over the rear wall of the beehive. When it is desired to disclose said rear wall, the movable part 16 is turned upwardly and downwardly upon the stationary part 15. The roof is formed of overlapping planks and adapted to be taken to pieces when so required—for instance, in the case of pastoral beekeeping. The stationary part 15 of the roof is connected to the beehive by means of a latch 19, engaging a notch provided in a block of wood 18, secured to said part of the roof. A small supplemental roof 20 is provided to protect the hinges 17 from rain, &c.

21 designates a wooden plank secured to the stationary part of the roof and resting on the top of the beehive. A latch or equivalent 22, pivotally mounted on the side wall of the beehive, engages a slot or an eye 23 on said plank 21 in order to assist in holding the part 15 on the beehive.

The front wall of the beehive has a plurality of openings or flight-holes.

24 and 25 indicate the lower flight-holes of the brood-chamber. 26 26 are metal plates adapted to close said flight-holes.

27 is a flight-hole provided at about the middle of the height of the brood-chamber and adapted to be closed by means of the plate 28.

29 is a hole provided at about the middle of the height of the honey-chamber.

Hinged below the holes 24 and 25 is a flight-board 30, adapted to be folded against the beehive, and suspended from lugs 31 is a shelter-plate 32, supported on brackets 33 and serving to shelter the bees from rain, &c., and to receive the honey-laden bees when the beehive is slanted for manipulation.

The opening 29 serves as a ventilation-hole in summer and may be closed by means of wire-gauze.

The interior of the beehive is divided by a horizontal partition 50 into two parts—first, the brood-chamber, and, second, the honey-chamber. The brood-chamber is occupied by the bees during the whole year and particularly during the hibernating season and a part of the spring. Said chamber is located at the lower part of the beehive. The honey-chamber is employed by the bees to deposit the surplus of honey therein.

The brood-chamber comprises a plate 34, Figs. 3 and 5, forming the bottom thereof and supporting the frames 35. In order to guide the latter, bars 36 are nailed upon said plate at intervals of seven to eight millimeters, said bars being five millimeters thick and thirty millimeters wide and having beveled edges. The grooves formed by said bars are engaged by pins secured to the uprights of each frame. The plate is provided with as many grooves as there are frames, and also with two grooves, one at each end, serving to receive partitions provided with rack-bars, as hereinafter described. In order to remove during the winter season the moisture and detritus sliding over the plate by reason of the inclination of the beehive toward the flight-holes 24, I provide at the junction-line of the plate and the bottom an opening, the width of which corresponds to the width of the space between the bottom of the beehive and the rear upright of the frames, (say seven to eight millimeters.) Said opening, which is closed during the summer by means of a bar 37, Fig. 4, covered in turn by the small door 38, is open in winter, said bar 37 being then removed and the small door 38 brought to the inclined position shown in Fig. 6 and held in this position by means of metal plates 39, so as to prevent gnawing animals or cold winds from entering the hive. The particles of operculum and wax, the dead bees, &c., drop through said opening upon the ground. Should a large number of dead bees obstruct the opening, the small door can be opened completely by turning downwardly onto the retaining-plates 39.

The flight-holes 24 25 have a height of two centimeters to enable the bees to freely pass through the same. Said opening may be contracted by means of the plates 26 when so required.

The holes 27 and 29 have a height of seven millimeters and are closed during the winter season by means of pieces of wood.

The frames within the beehive are separated from each other by means of a metal plate 40, cut out, as clearly shown in Fig. 5, and constituting one of the essential parts of the beehive. Said plate is suitably secured to the inner front wall and serves to receive the upper pin of the rear upright of each frame. When said pin is introduced between the teeth of the plate 40, it immediately engages the groove in said plate, which groove registers with the groove in the plate 34. Both chambers are provided with a separating-plate of the kind described. In order to avoid propolization, the metal plate 40 must be located at a distance of seven millimeters five from the top, while the cross-bar and upright of the frame immediately under said plate is located seven millimeters five lower. Each of the frames of the brood-chamber measures three hundred and thirty by three hundred and thirty millimeters, while the frames of the honey-chamber measure three hundred and thirty by one hundred and sixty-five millimeters. The bars of the frames have a width of twenty-five millimeters, the two uprights are fifteen millimeters thick, and the two cross-bars twelve millimeters. The rear upright of the frames is beveled, Figs. 7 and 9, in order to prevent the bees from being crushed between the bottom of the hive and the frame when the latter is turned over. The lower cross-bar is situated seven to eight millimeters higher than the bar of the plate 34 and twelve to thirteen millimeters above the bottom of the groove. Therefore the front upright 61 and the rear upright 42 extend to a distance of seven to eight millimeters beyond the lower bar. These parts are provided with supporting head-pins 43. The frames are separated from each other by means of pins 44 44, secured to the cross-bars 45 46 of the frame. Two other pins 47 are secured to the rear upright 42 to maintain the space of seven millimeters five between the bottom of the beehive 48 and said frame. A pin 49, secured to the top end of the upright 42, serves to engage the frame with the separating-plate 40. The frames of the honey-chamber are constructed in a similar manner. The partition 50 between the two chambers may be removed from the beehive, so as to form only one chamber. Said partition is supported on the inner side walls and held in place by means of grooved bars 60.

In order to enable the bees to pass from one chamber into the other, three openings 51 are provided in the partition 50, Fig. 5. Said partition is strengthened by means of two cross-bars in order to withstand the weight of the loaded combs. Partition-walls 52, provided with rack-bars, separate the bees from the remaining part of the beehive. Said partition-walls are arranged similar to the frames and provided with a head-plate 53, Figs. 10 and 11, a bar 54, serving as a lever, and a circular rack-bar 55. Said parts are provided to raise the partition-wall to the top and lock the same in its raised position. The partition-walls serve to decrease or increase the space reserved to the colony, the remaining space being filled with straw during the winter season. The frames are covered by means of planks 56, arranged side by side and resting on suitable bars. Each of the chambers is provided with a glass plate 61, Fig. 18. This plate may be substituted by what may be termed a "summer partition," provided with a glass plate and divided into two parts by means of a cross-bar 57, Fig. 14, in which is cut a saw-notch 62, which may be engaged by a metal blade serving to move the frames.

The "winter partition" (shown in Fig. 15) is arranged upon the aforesaid walls during the winter season and a part of the spring. Said winter partition is formed of a case filled with straw 63, retained by means of plates 64. The top and sides of said case are provided with a cushion 65, made of strong cloth and filled with wadding or the like to avoid loss of heat.

The grooved bars 60 are provided to hold in place the partition between the two chambers, said bars being suitably secured to the sides of the beehive.

The door situated at the rear of the beehive, which closes the rear end of the hive and through which the frames and partitions can be removed and adjusted as desired, is constructed similarly to said partition between the chambers—that is, the plank 66 is arranged between two cross-bars 67. Said door is held in place by means of four latches.

When the beehive is to be placed in a closed apiary, the roof is removed therefrom and the last-described oscillating mechanism is employed, the trunnions 2 being inserted into slots 64, provided in the ferrules of the supporting-standards, Figs. 9 and 20.

Having fully described my invention, what I claim, and desire to secure by Letters Patent, is—

1. In a beehive, the combination of a base or support, a hive-body revolubly mounted on said support, and means for holding the body in any adjusted position.

2. In a beehive, the combination with a suitable base or support, of a body, rectangular in cross-section, mounted on said base and movable about a horizontal axis, and a fastening means for holding the hive-body in any adjusted position, consisting of a member secured to the hive and extending concentric with the axis about which the hive is movable, and a coacting member on the support adapted to engage with the first said member at any desired point in its length.

3. In a beehive, the combination of two uprights or standards, a hive-body mounted on trunnions fitted to bearings in said uprights, a rack secured to and extending concentric with the axis about which the hive-body is movable, and a pawl or dog mounted on one of the standards and adapted to engage the teeth of said rack.

4. In a beehive, the combination of two uprights or standards, a hive-body, arranged between said standards and rotatably mounted thereon by horizontal trunnions, a rack extending concentric with the axis about which the hive-body is movable, a pawl mounted on one of the standards and adapted to engage with the rack for holding the hive in any desired position, and a releasing-slide for the pawl mounted on said standard.

5. The combination with a beehive, of means for supporting a series of frames within the hive, partitions adapted to be inserted within the hive between the series of frames and an adjacent side wall, each of said partitions bearing against one wall of the hive and having an adjustable member adapted to be forced into contact with the opposite wall and means for locking said member in any adjusted position.

6. In the improved beehive, the combination with the casing thereof, of a roof mounted upon said casing and comprising a stationary part removably secured to the top of the beehive, and a movable part hinged to said stationary part and covering the rear wall of the beehive, a free space being left between said parts of the roof and the walls of the beehive, to receive a filling of straw, substantially as and for the purpose set forth.

7. The combination with an oscillating beehive and a suitable supporting-frame therefor, of a circular plate suitably secured to the side of the hive, gear-teeth on the inner periphery of the plate, two pawls pivotally secured to the supporting-frame and adapted to engage said gear-teeth, and means for readily disengaging said pawls, substantially as set forth.

In testimony whereof I have hereunto set my hand in presence of two witnesses.

RAPHAËL DECROLY.

Witnesses:
C. SCHEY,
GREGORY PHELAN.